United States Patent [19]
Van Lahr et al.

[11] Patent Number: 4,772,963
[45] Date of Patent: Sep. 20, 1988

[54] DUPLICATE DIGITAL DATE RECORDING APPARATUS FOR ENHANCING BIT ERROR RATE PERFORMANCE OF A DATA STORAGE MEDIUM

[75] Inventors: Leo T. Van Lahr, Glendora; Levi H. Robinson, Fullerton, both of Calif.

[73] Assignee: Datatape Incorporated, Pasadena, Calif.

[21] Appl. No.: 922,239

[22] Filed: Oct. 23, 1986

[51] Int. Cl.⁴ .............................................. G11B 5/09
[52] U.S. Cl. ........................................ 360/47; 360/53
[58] Field of Search ............... 360/47, 53, 54; 371/10, 371/39

[56] References Cited

U.S. PATENT DOCUMENTS

| | | | |
|---|---|---|---|
| 2,813,259 | 11/1957 | Burkhart | 360/47 |
| 2,929,049 | 3/1960 | Lubkin | 360/53 |
| 3,281,804 | 10/1966 | Dirks | 360/47 |
| 3,761,903 | 9/1973 | Bird, Jr. et al. | 360/53 |
| 3,859,513 | 1/1975 | Chuang et al. | 371/36 |
| 3,870,824 | 3/1975 | Baichtal et al. | 379/125 |
| 4,202,018 | 5/1980 | Stockham, Jr. | 360/53 |
| 4,224,642 | 9/1980 | Mawatari et al. | 360/47 |
| 4,328,580 | 5/1982 | Stockham, Jr. et al. | 360/47 |
| 4,494,155 | 1/1985 | Veillard | 360/53 |
| 4,506,306 | 3/1985 | Veillard | 360/47 |
| 4,558,446 | 12/1985 | Banba et al. | 371/10 |

FOREIGN PATENT DOCUMENTS

| | | | |
|---|---|---|---|
| 0085517 | 9/1983 | European Pat. Off. | 360/47 |
| 5778687 | 5/1982 | Japan | 360/47 |

Primary Examiner—Raymond F. Cardillo
Assistant Examiner—Surinder Sachar
Attorney, Agent, or Firm—Dennis P. Monteith

[57] ABSTRACT

Apparatus for enhancing the bit error rate performance of a storage medium, such as magnetic tape, magnetic disk, optical disk, or an equivalent thereof, includes two data transmission channels for recording in duplicate a stream of data bits corresponding to an information-bearing signal, each recorded bit stream being potentially influenced by a pattern of statistically distributed recording surface defects. During playback, error detection and correction circuitry for each channel provides an alarm signal synchronized with each uncorrected error condition in the corresponding stream of playback bits. A control circuit, responsive to the alarm signals from each channel, serves to interleave error-free bits from one channel, to the exclusion of error bits from the other channel, to provide a single continuous stream of relatively error-free bits corresponding to the information-bearing signal recorded.

5 Claims, 4 Drawing Sheets

DUPLICATE DIGITAL DATE RECORDING APPARATUS FOR ENHANCING BIT ERROR RATE PERFORMANCE OF A DATA STORAGE MEDIUM

BACKGROUND OF THE INVENTION

1. Field of the Invention

The present invention relates generally to the recording of high frequency digital data. More specifically, the invention relates to the improvement of bit error rate (BER) performance in data recorded and played back from a storage medium such as a magnetic tape, magnetic disk, optical disk, or an equivalent thereof.

2. Description Relative to the Prior Art

The ubiquitous digital computer is, of course, available in the marketplace with various data handling capacities. Even with a large scale so-called mainframe computer, there is a need for peripheral equipment for temporary or long term storage of digital data. With the ever increasing speed of digital systems, it is necessary that such peripheral equipment handle data at a speed compatible with the data-handling capability of a master computer. It is also necessary that the storage medium of the peripheral equipment store data with a high packing density, to limit the space required for huge data quantities.

A high packing density means that the recording medium must be capable of handling very short wavelength signals. Imperfections in the recording surface of a peripheral storage medium can play an important part in limiting the data-handling capability of peripheral equipment.

At a moderate data packing density, a surface defect can cause an isolated bit or a few isolated bits to be in error. These errors can usually be corrected by a data handling algorithm known in the art for example Reed Solomon. With a higher packing density however that same surface defect may cause a burst error. Thus, a more powerful error correcting algorithm is required. Unfortunately, short (one or two bit) channel margin related errors that can occur over microscopically small localized regions of the storage medium are detrimental to a moderately powerful error correction algorithm designed to handle burst errors. A very powerful error correcting code must be employed to handle both types of errors. Such a code, however, implies extensive calculations with an attendant increase in signal processing complexity, decoding speed and delay time; thus, it has not been practical to incorporate an error correction technique which can efficiently handle all of the various type of errors caused by a peripheral storage medium.

With small defects of the type commonly found in high-quality magnetic tape, for example, a digital tape recorder characteristically exhibits on the order of one bit error in $10^5$ bits. With error correction circuitry, on the other hand, a modern digital tape recorder can be expected to have one bit error in $10^9$ bits. Such error-correction capability is adequate for some data-storage uses, e.g. for transmitting image data wherein optical image integration tends to mask completely minor data errors. For storage and retrieval of more general digital computer data, however, the general view is that not more than one bit error in $10^{11}$ or $10^{12}$ bits can be tolerated in a computer system currently planned for the near future.

With the recognition that an error correcting code has practical limitations, U.S. Pat. No. 4,506,306 discloses digital signal processing apparatus for improving the bit error rate (BER) performance of digital tape recorder playback data having missing bit(s) due to tape dropout(s). To that end, a bit stream of input data is interleaved with itself in such a way that the respective interleaved portions are displaced from each other, within a tape record track, by a distance corresponding to at least the statistical maximum size of a tape dropout. By continuously delaying one such interleaved playback portion relative to the other for a time sufficient to bring the two playback portions into sync with each other, the original bit stream may be reconstructed by toggling back and forth between the two playback portions each time a dropout is detected in either playback portion.

Although the apparatus of the aforementioned patent works well for its intended purpose, it suffers from a disadvantage in that it is limited to overcoming data errors of the type that are characterized by the complete absence of a data pulse. In other words, parity errors and other data errors associated with commonly encountered statistically distributed tape defects may not be correctable. A further limitation is that, due to the interleaving of a data bit stream with itself, maximum raw data rate is limited to one-half the rate that a signal processing channel of the tape recorder can reliably handle.

SUMMARY OF THE INVENTION

In view of the foregoing, it is an object of the invention to improve the bit error rate performance of a digital data storage medium having randomly distributed recording surface defects, without compromising the maximum rate at which digital data may be transferred during recording and/or playback operations. This object is achieved by means of digital data recording apparatus having first and second digital data transmission channels each of which is arranged to transfer a duplicate stream of data bits corresponding to a given information-bearing signal. When the storage medium is magnetic tape, for example, first and second magnetic head means, coupling respectively first and second record tracks of the magnetic tape and the first and second data transmission channels, serve for recording on their associated record tracks, and then for playing back, on their associated data transmission channels, first and second corresponding streams of data bits representative of the information-bearing signal, each stream of playback bits being potentially influenced by a random pattern of tape recording surface defects. Each data transmission channel includes error correction circuitry, operable during playback, for detecting and correcting data errors in their respective playback channels, and for providing, respectively, first and second alarm signals in synchronism with each uncorrected data error condition in their respective data transmission channels. A control circuit, responsive to both the first alarm signal and to the second alarm signal, is arranged for causing the first and second data transmission channels to sequentially interleave error-free portions of their respective playback bit streams, to the exclusion of playback bits on the other channel, in timed relationship to the occurrence of an alarm signal in such other channel, thereby transferring a single continuous stream of error-free playback data corresponding to the information-bearing signal.

By providing separate data transmission channels for the transferring of a duplicate stream of data bits, digital recording apparatus in accordance with the invention is free to record and to playback digital data at a maximum rate permitted by the bandwidth of the data channels.

A "global" recording surface defect -- one in which the size may cause simultaneous data errors in both record tracks -- may cause statistically dependent uncorrected data errors in the same bit cells of both playback data streams. Accordingly, an alternative preferred embodiment includes a digital delay line, operable during recording on one of the data channels, to delay one input data stream relative to the other so that corresponding portions of the recorded data streams are displaced from each other by a distance at least as great as the expected size (from a statistical viewpoint) of the maximum surface defect. The other data channel includes an identical digital delay line, operable during playback, for synchronizing corresponding bit cells of both playback data streams.

By displacing the data stream recorded on one channel relative to the data stream duplicated on the other channel, by an amount as great as any surface defect, playback data errors in corresponding bit cells of both playback bit streams are statistically independent of each other, to enhance the likelihood that an uncorrected data error will not occur in the same bit bell of both playback channels.

The invention and its other advantages will become more apparent in the detailed description of the preferred embodiments presented below.

DESCRIPTION OF THE DRAWINGS

The invention will be described with reference to the accompanying drawings, wherein.

DETAILED DESCRIPTION OF THE PREFERRED EMBODIMENTS

The invention requires digital recording apparatus for recording and playback of relatively error-free digital data, at a rate that is compatible with the peak data-handling speed of commercially available digital computers e.g., a data rate on the order of 100 megabits per second (Mbps). To that end, the recording apparatus includes a pair of broadband data transmission channels arranged to synchronously transfer a duplicate stream of high frequency data bits corresponding to a given information-bearing signal to be recorded. For that purpose, digital data recording apparatus 10 of FIG. 1 includes a pair of data transmission channels 12 and 14 having their respective input terminals connected, for a recording operation, to receive a common source of digital input data. Similarly, the opposing output terminals of both channels 12 and 14 are connected, in a playback mode, to a common data-receiving unit 16, such as a digital computer.

Figure 1:
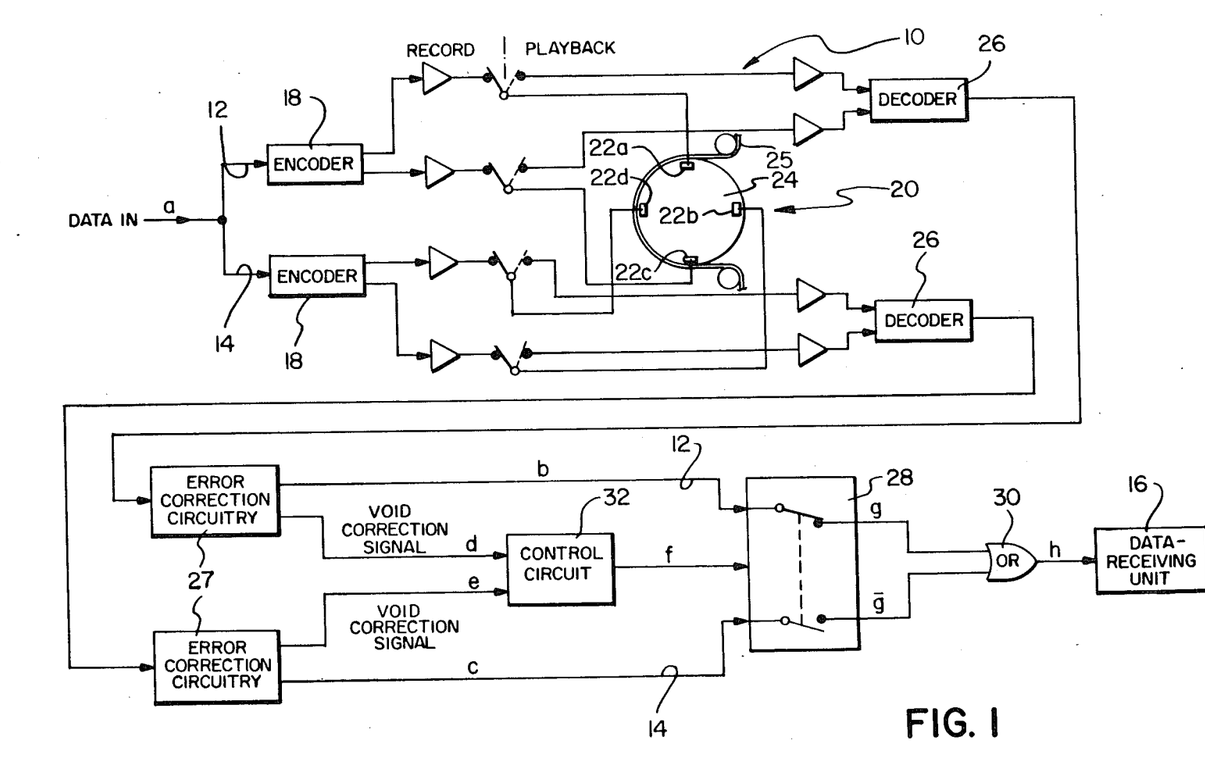
FIG. 1 is a schematic block diagram of digital magnetic tape recorder apparatus in accordance with the invention.
Figure 2:
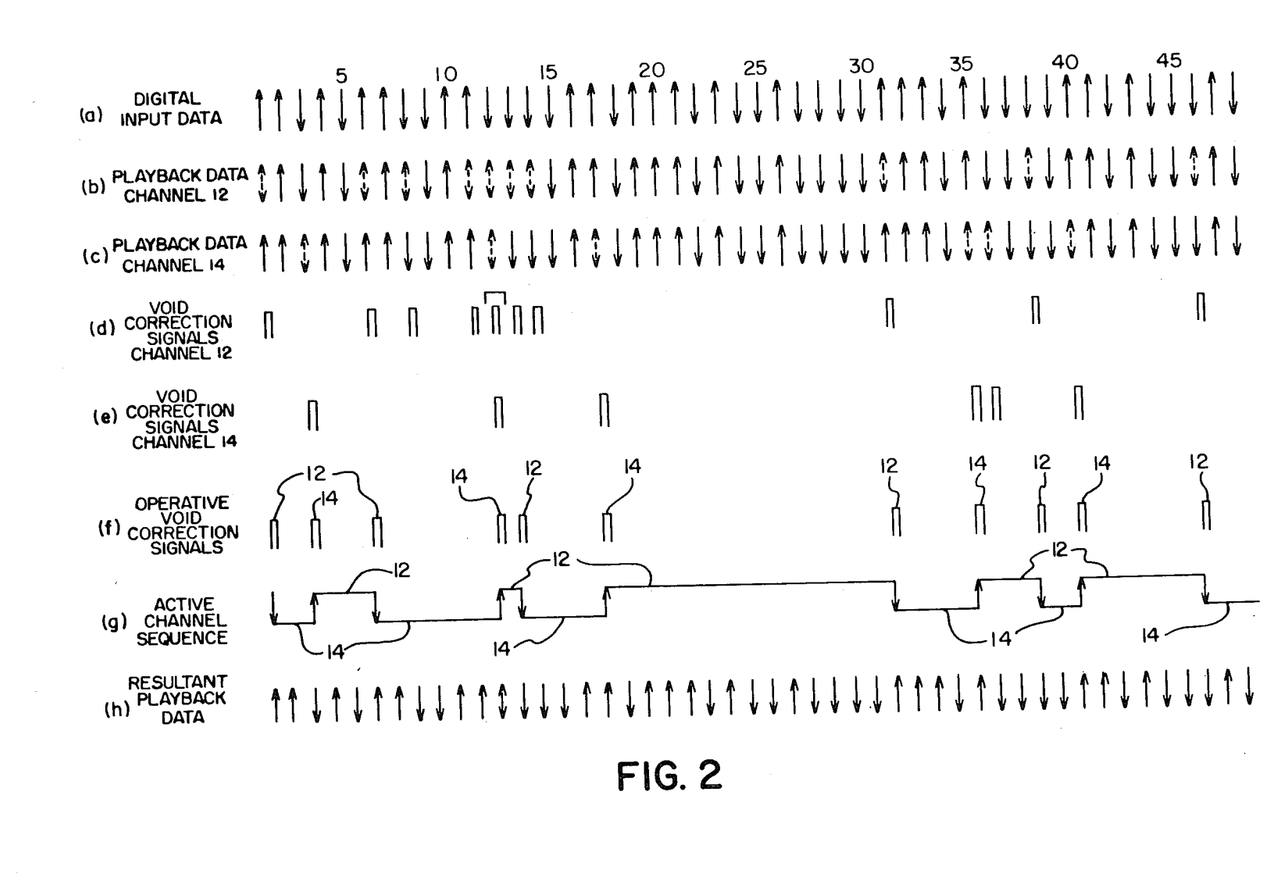
FIG. 2, consisting of (a) through (h), is a set of signal waveform diagrams useful in describing the operation of the apparatus of FIG. 1.

In each recording channel, an encoder 18, as is known in the art, serves to map the incoming stream of data bits into a code sequence which has properties required by the recording apparatus 10. With a magnetic recording system, for example, each encoder 18 may accept non-return-to-zero (NRZ) data and encode the same in a conventional format of the type employed to provide a low DC content, such as delay modulation mark (DMM). In the representation of a digital input data stream (FIG. 2a), a vertically upright arrow represents arbitrarily a binary 1 and a downwardly pointing arrow a binary 0. (The letters associated with the waveform diagrams of FIG. 2 are indicated at the appropriate points in the schematic of FIG. 1 to facilitate understanding of the invention.)

To record high frequency digital data magnetically, with extremely high bit packing density, the recording apparatus 10 preferably includes a head scanner 20. For that purpose, the scanner 10 includes a plurality of magnetic heads 22a, 22b, 22c and 22d angularly distributed on the periphery of a rotatable headwheel 24. As is well known in the head scanner art, the heads 22a through 22d serve for recording and/or playing back information from a series of closely spaced parallel record tracks (not shown) slanted across a magnetic tape 25.

To record and/or play/back high density digital data simultaneously from multiple channels, the heads 22a and 22c are arranged on the headwheel 24 for cooperatively making successive operative sweeps across the tape 25, to provide uninterrupted recording and/or play/back of the data stream received from the transmission channel 12. Similarly, the heads 22b and 22d are arranged for recording and/or play/back of a single, uninterrupted stream of bits on the data transmission channel 14. The encoder 18 for the channel 14 serves conveniently to provide a delay to compensate for the ninety degree (90°) lag that the heads 22b and 22d have with respect to the corresponding heads 22a and 22c.

In the reverse direction of data flow (playback), the magnetic heads feed DMM playback data to a decoder 26 of their associated data transmission channels. Each decoder serves to convert received data to NRZ format.

In a playback mode involving digital data recording apparatus, most data errors are directly related to the medium on which the data is recorded. With magnetic tape, for example, any slight imperfection in the oxide coating of the tape will cause "dropouts" -- areas where no information is recorded, or is recorded at such a low level as to be undetectable during a playback operation. Dust, lint, and other foreign material on the recording surface of any record medium may also result in dropouts. A record medium that has become excessively worn is yet another cause of individual bit and/or burst errors. There are other reasons for the occurrence of errors, of course, but none which contributes as significantly to bit error rate (BER) performance as the record medium itself.

Accordingly, during playback, each of the channels 12 and 14 includes error correction circuitry 27 that serves to detect and to correct any of a variety of data errors. To that end, the circuitry 27 for each data transmission channel functions to detect and to correct an isolated bit error, simultaneous bit errors (two or more isolated bit errors in a given block of data bits) and burst errors (a string of consecutive errors ranging in length from two to as many as several thousand bits).

It is not possible, from a practical standpoint, to correct all errors that are detected when the BER exceeds a given level, particularly when a burst error exists of several bits in duration. Therefore, the invention further requires that the error detection circuitry 27 for each channel serves to provide an alarm signal (a void correction signal) in synchronism with an uncorrected bit error condition in the corresponding playback data stream.

Assuming that the magnetic tape 25 has a pattern of statistically distributed recording surface defects, FIGS. 2b and 2c illustrate, respectively, a hypothetical stream of playback bits on the channel 12 and on the channel 14, corresponding to the recorded bit stream of FIG. 2a. The randomly distributed double-arrowed phantom lines of FIGS. 2b and 2c represent uncorrected error bits, which presumably are due primarily to surface defects on the corresponding record track for each playback data stream.

FIG. 2d shows the corresponding sequence of void correction signals produced by the error correction circuitry 27 of the channel 12; similarly, FIG. 2e shows the sequence of void correction signals for the channel 14.

To improve BER performance during a playback operation the invention further requires means which serves to synchronously interleave correct data bits on channel 12 with correct data bits on channel 14, to provide a single continuous stream of relatively error-free playback data corresponding to the data recorded. To that end, a composite electronic switch 28 couples exclusively, at any one time, either the output of the channel 12 or the output of the channel 14, through an OR gate 30, with the data-receiving unit 16.

When an uncorrected error bit is encountered on the channel that is coupled with the data-receiving unit 16 (the currently active channel), the switch 28 synchronously decouples that channel and couples the other channel (the currently inactive channel) to the data-receiving unit. When a data error is then encountered on the newly active channel, the switch 28 decouples the last-mentioned channel and applies the output of the inactive channel to the unit 16. By toggling back and forth between the channels in synchronism with a data error on the currently active channel, a resultant data bit stream is produced that is relatively error-free, compared to the bit stream on each individual channel. So long as the same bit cell on each channel does not contain an uncorrected error, the resultant data bit stream is completely error free.

To interleave bits from one channel to the exclusion of bits from the other, a control circuit 32 has a pair of inputs to receive, respectively, a void correction signal from the channel 12 and from the channel 14. The circuit 32 serves to cause the switch 28 to switch from the channel which is active to the inactive channel only when a void correction signal is received from the active channel. Accordingly, when consecutive void correction signals -- two or more -- arise from the same channel, the control circuit 32 responds to only the first of such successive signals.

FIG. 2f shows the sequence of void correction signals that causes the switch 28 to toggle from one channel to the other channel under the influence of the control circuit 32; FIG. 2g illustrates which of the two channels is active to the exclusion of the other channel; and FIG. 2h shows the resultant sequence of playback bits applied to the data-receiving unit 16.

Figure 3:
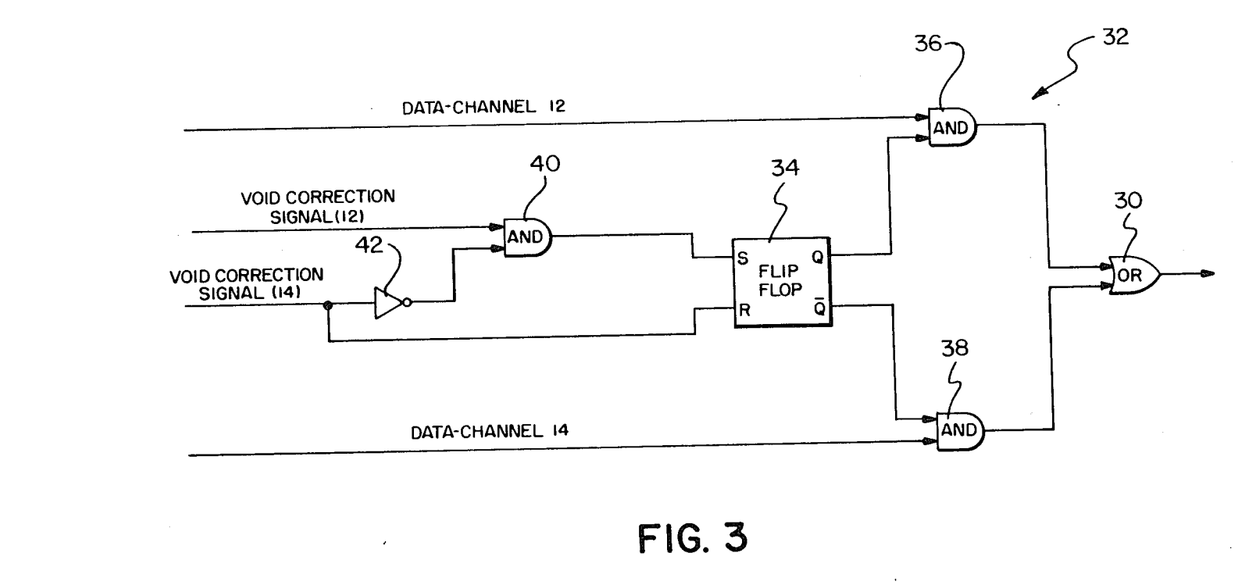
FIG. 3 is a more detailed schematic block diagram of a portion of the circuitry of FIG. 1.

The control circuit 32 is shown in further detail in FIG. 3. A set-reset flip flop 34 receives a void correction signal, from the channel 12, at its S-input and a void correction signal, from the channel 14, at its R-input. In operation, when the channel 12 is active, a signal at the S terminal causes the Q output to go low. (If the Q output is already low -- channel 12 is inactive -- the Q output, of course, remains low.) This output condition disables an AND gate 36 while the $\overline{Q}$ output simultaneously enables an AND gate 38.

Similarly, when the channel 14 is active, an input at the R terminal causes the complementary Q output to go low. This disables the AND gate 38 while the Q output enables the AND gate 36.

To prevent an undefined state at the output of the flip flop 34, an AND gate 40 and an inverter 42 cooperatively serve to prevent concurrent void correction signals from being applied simultaneously to each of the two input terminals of the flip flop. If a given bit cell has an uncorrected error on both channels 12, 14 (concurrent void correction signals), the gate 40 and the inverter 42 operate to cause only the R terminal to receive a void correction signal. In other words, when simultaneous channel errors occur, switching from one channel to the other would only occur if the channel 14 was active at the time of a simultaneous error. In either case, the uncorrected error on the channel 12, which if active stays active or which becomes active if previously inactive, is applied to the OR gate 30.

FIGS. 2b and 2c illustrate an uncorrected data error in the same bit cell (cell 12) of each playback channel. As is further shown in FIG. 2h, when a simultaneous error occurs, the resultant digital output would include a corresponding bit cell error.

Simultaneous channel errors are more likely to occur when the record medium has a relatively large surface defect. When this condition exists, surface defects may no longer be statistically independent from one record track to the next, particularly when the record tracks are adjacent each other.

Figure 4:
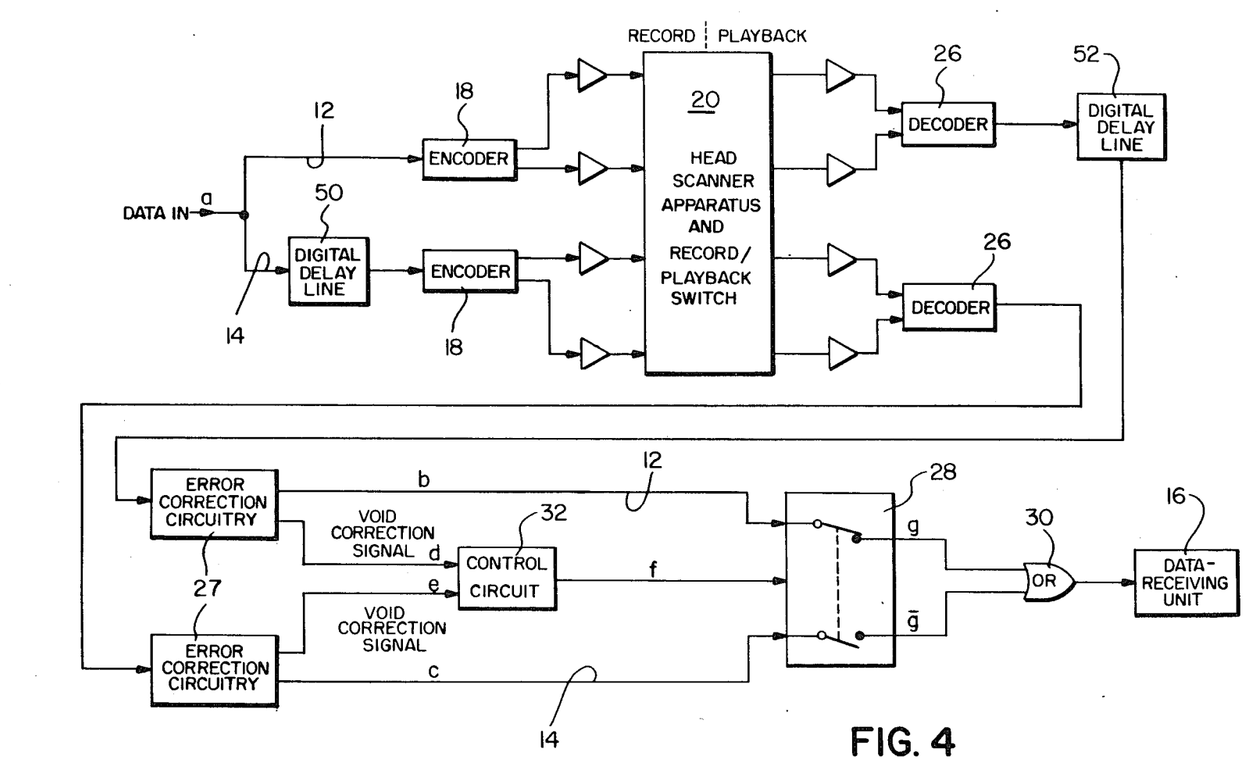
FIG. 4 is a schematic block diagram of an alternative preferred embodiment of digital magnetic tape recorder apparatus for practicing the invention.

FIG. 4 illustrates an alternative preferred embodiment in which data to be recorded is delayed on one channel with respect to the corresponding data on the other channel. When the delay, in terms of space on the record medium, is at least as great as the size of an expected maximum defect (from a statistical point of view), the same defect is prevented from causing corresponding data from both channels to be in error. To that end, a digital delay line 50 serves to delay, by a predetermined amount, the data on the channel 14 to be recorded relative to the corresponding data on the channel 12. (Elements of FIG. 4 that are otherwise identical or similar to the elements of FIG. 1 are identified by like numerals.)

During a playback operation, on the other hand, a digital delay line, on the opposite channel, serves to bring corresponding bits on the two channels back into synchronization. For that purpose, a digital delay line 52, which has the same delay as the digital line 50, functions to delay playback data on the channel 12 relative to the playback data on the channel 14. Otherwise, the transferring of generally error-free data on one channel, to the exclusion of data on the other channel, is achieved in accordance with the operation of the apparatus of FIG. 1.

The invention has been described in detail with particular reference to two preferred embodiments thereof, but it will be understood that variations and modifications can be effected with the spirit and scope of the invention. With magnetic tape, for example, separate magnetic heads may be employed for record and playback operations, with data for each channel being recorded on continuous longitudinal record tracks, parallel with the edge of the magnetic tape.

What is claimed is:

1. For use with a record medium having a pattern of statistically distributed recording surface defects, apparatus for enhancing the bit error rate performance of the record medium, said apparatus comprising:
   (a) first and second digital data transmission channels each of which is arranged to transfer an identical stream of data bits corresponding to a given information-bearing signal;
   (b) first and second transducer means, coupling respectively first and second record tracks of the record medium and said first and said second data transmission channels, to record, on their respective record tracks, and then to play back, on their respective data transmission channels, first and second corresponding streams of data bits representative of the given signal, each stream of playback bits being potentially influenced by the pattern of recording surface defects, said first and second transducer means cooperating, respectively, with said first and second digital data transmission channels to play back bits of the first data stream substantially in phase with corresponding bits of the second data stream;
   (c) first error correction circuitry and second error correction circuitry connected, respectively, to said first and second data transmission channels, for providing, respectively, a first alarm signal corresponding to an uncorrected bit-error condition in said first data transmission channel and a second alarm signal corresponding to an uncorrected bit-error condition in said second data transmission channel; and
   (d) control means, responsive to the first alarm signal and to the second alarm signal, and arranged to cause said first and said second data transmission channels to synchronously interleave in real time error-free portions of their respective bit streams, to the exclusion of corresponding data bits on said other channel, in timed relationship to the occurrence of an alarm signal in said other data channel, to transfer in real time a single continuous stream of error-free playback data corresponding to the information-bearing signal.

2. For use with a magnetic tape having a pattern of statistically distributed recording surface defects, apparatus for enhancing the bit error rate performance of a digital tape recorder, said apparatus comprising:
   (a) first and second digital data transmission channels each of which is arranged to transfer, respectively, identical first and second streams of data bits corresponding to a given information-bearing signal;
   (b) first and second magnetic head means, coupling respectively first and second record tracks of the magnetic tape and said first and said second data transmission channels, to record, on their respective record tracks, and then to play back, on their respective data transmission channels, first and second corresponding streams of data bits representative of the given signal, each stream of playback bits being potentially influenced by the pattern of recording surface defects, said first and second magnetic head means, cooperating, respectively, with said first and second digital data transmission channels to play back bits of the first data stream substantially in phase with corresponding bits of the second data stream;
   (c) first error correction circuitry and second error correction circuitry connected, respectively, to said first and second data transmission channels, for providing, respectively, a first alarm signal corresponding to an uncorrected bit-error condition in said first data transmission channel and a second alarm signal corresponding to an uncorrected bit-error condition in said second data transmission channel; and
   (d) control means, responsive to the first alarm signal and to the second alarm signal, and arranged to cause said first and said second data transmission channels to synchronously interleave in real time error-free portions of their respective bit streams, to the exclusion of corresponding data bits on said other channel, in timed relationship to the occurrence of an alarm signal in said other data channel, to transfer in real time a single continuous stream of error-free playback data corresponding to the information-bearing signal.

3. For use with a magnetic tape having a pattern of statistically distributed recording surface defects, apparatus for enhancing the bit error rate performance of a digital tape recorder, said apparatus comprising:
   (a) first and second digital data transmission channels each of which is arranged to transfer an identical stream of data bits corresponding to a given information-bearing signal;
   (b) first and second magnetic head means, coupling respectively first and second record tracks of the magnetic tape and said first and said second data transmission channels, to record, on their respective record tracks, and then to play back, on their respective data transmission channels, first and second corresponding streams of data bits representative of the given signal, each stream of playback bits being potentially influenced by the pattern of recording surface defects, said first and second magnetic head means, cooperating, respectively, with said first and second digital data transmission channels to play back bits of the first data stream substantially in phase with corresponding bits of the second data stream;
   (c) first error correction circuitry and second error correction circuitry connected, respectively, for detecting and correcting data errors in said first and second data transmission channels, and for providing, respectively, a first alarm signal corresponding to each uncorrected bit-error condition in said first data transmission channel and a second alarm signal corresponding to each uncorrected bit-error condition in said second data transmission channel; and
   (d) control means, responsive to the first alarm signal and to the second alarm signal, and arranged for rendering (1) said second data transmission channel operative and said first data transmission channel inoperative in response to the first alarm signal, and (2) said first data transmission channel operative and said second data transmission channel inoperative in response to the second alarm signal, to cause said first and said second data transmission channels to exclusively and synchronously interleave in real time error-free portions of their respective bit streams in timed relation to the occurrence of an alarm signal in the other data channel, to transfer in real time a single continuous stream of relatively error-free playback data corresponding to the information-bearing signal.

4. Apparatus as defined in claim 3 wherein said control means inhibits transmission of the stream of playback bits on said data transmission channel in which the last to occur uncorrected bit-error condition exists until an uncorrected bit-error condition occurs on said other data transmission channel.

5. For use with a magnetic tape having a pattern of statistically distributed recording surface defects, apparatus for enhancing the bit error rate performance of a digital tape recorder, said apparatus comprising:
(a) first and second data transmission channels having corresponding input terminals coupled in a record mode to a common source of binary input data and having opposing output terminals coupled in a playback mode to a common data-receiving source, to transfer a duplicate stream of data bits corresponding to a particular information-bearing signal;
(b) first and second magnetic head means, coupling respectively first and second record tracks of the magnetic tape and said first and said second data transmission channels, to record, on their respective record tracks, and then to play back, on their respective data transmission channels, first and second corresponding streams of data bits representative of the particular information-bearing signal, each stream of playback bits being potentially influenced by the pattern of recording surface defects;
(c) a first delay line, serially connected to said first data transmission channel to operate in a record mode, for delaying by a predetermined amount the transmission of the stream of data bits in said first data transmission channel relative to the transmission of the duplicate stream data bits in said second data transmission channel;
(d) a second delay line, serially connected to said second data transmission channel to operate in a playback mode, for delaying by the aforementioned predetermined amount the transmission of the stream of playback bits in said second data transmission channel so that data bits transmitted in said second data transmission channel are substantially in phase with corresponding data bits transmitted in said first data transmission channel during a playback operation;
(e) first and second error correction circuitry, serially connected, respectively, with said first and second data transmission channels, to provide, respectively, a first alarm signal corresponding to an uncorrected bit-error condition in said first data transmission channel and a second alarm signal corresponding to an uncorrected bit-error condition in said second data transmission channel; and
(f) a control circuit, responsive to the first alarm signal and to the second alarm signal, and arranged for rendering (1) said second data transmission channel operative and said first data transmission channel inoperative in response to the first alarm signal, and (2) said first data transmission channel operative and said second data transmission channel inoperative in response to the second alarm signal, to cause said first and said second data transmission channels to exclusively and synchronously interleave in real time error-free portions of their respective playback bit streams in timed relation to the occurrence of an alarm signal in the other data channel, to transfer in real time a single continuous stream of relatively error-free playback data corresponding to the particular information-bearing signal.

* * * * *

UNITED STATES PATENT OFFICE
CERTIFICATE OF CORRECTION

PATENT NO. : 4,772,963
DATED : September 20, 1988
INVENTOR(S) : L. Van Lahr and L. Robinson It is certified that error appears in the above-identified patent and that said Letters Patent are hereby corrected as shown below:

Title page (line 54)   The first line of the title is incorrect. Please change "DATE" to read --DATA--.

Signed and Sealed this

Thirty-first Day of January, 1989

Attest:

DONALD J. QUIGG

Attesting Officer   Commissioner of Patents and Trademarks